(12) United States Patent
Park et al.

(10) Patent No.: US 8,429,821 B2
(45) Date of Patent: Apr. 30, 2013

(54) METHOD OF FABRICATING VALVE UNIT IN A MICROFLUIDIC DEVICE

(75) Inventors: Jongmyeon Park, Seoul (KR); Jongsuk Chung, Hwaseong-si (KR); Jeonggun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1022 days.

(21) Appl. No.: 12/464,938

(22) Filed: May 13, 2009

(65) Prior Publication Data

US 2009/0282681 A1  Nov. 19, 2009

(30) Foreign Application Priority Data

May 14, 2008 (KR) ........................ 10-2008-0044728

(51) Int. Cl.
*B21D 51/16* (2006.01)
(52) U.S. Cl.
USPC ....................................................... 29/890.12
(58) Field of Classification Search ................ 29/890.12
See application file for complete search history.

(56) References Cited

FOREIGN PATENT DOCUMENTS

| EP | 1884284 A1 | 2/2008 |
|---|---|---|
| EP | 1889661 A1 | 2/2008 |
| EP | 2030686 A2 | 3/2009 |

*Primary Examiner* — David Bryant
*Assistant Examiner* — Moshe Wilensky
(74) *Attorney, Agent, or Firm* — Sughrue Mion, PLLC (57) ABSTRACT

Provided are a valve unit, a microfluidic device including the same, and a method of fabricating the valve unit. The method includes: forming a lower substrate including a channel including a first region and a second region which is deeper than the first region and is adjacent to one side of the first region; forming an upper substrate comprising a valve material chamber which extends only partially through the upper substrate; filling the valve material chamber with a valve material and curing the valve material in the valve material chamber; attaching a surface of the upper substrate in which the valve material chamber is formed to a surface of the lower substrate in which the channel is formed, so that the valve material chamber overlaps an overlapped portion of the first region, and does not overlap a non-overlapped portion of the first region; melting the valve material accommodated in the valve material chamber to flow the valve material into the non-overlapped portion of the first region; and curing the valve material flowed into the non-overlapped portion to close the first region.

20 Claims, 6 Drawing Sheets

METHOD OF FABRICATING VALVE UNIT IN A MICROFLUIDIC DEVICE

CROSS-REFERENCE TO RELATED PATENT APPLICATION

This application claims priority from Korean Patent Application No. 10-2008-0044728, filed on May 14, 2008 in the Korean Intellectual Property Office, the disclosure of which is incorporated herein in its entirety by reference.

BACKGROUND

1. Field

One or more embodiments relate to microfluidics, and more particularly, to a valve unit controlling fluid flow, a microfluidic device including the same, and a method of fabricating the valve unit.

2. Description of the Related Art

In general, microfluidic devices are used to perform biological or chemical reactions by manipulating small amounts of fluid. Microfluidic devices include microfluidic structures arranged in a platform in various forms, such as chips, disks, or the like. Such a microfluidic structure includes a chamber that can accommodate a fluid, a channel through which the fluid can flow, and a valve that can control the flow of the fluid. The chamber, channel, and valve may be disposed in the platform in a variety of configurations.

A biochip is such a microfluidic structure that is arranged in a small-sized chip platform in order to perform tests including biochemical reactions. In particular, a device that is manufactured to perform multi-step processing and manipulation on a single chip, is referred to as a lab-on-a chip.

To transfer a fluid in a microfluidic structure, an operating pressure is needed. A capillary pressure or a pressure applied by a separate pump is used as the operating pressure. Recently, centrifugal force-based microfluidic devices in which a microfluidic structure is arranged in a compact disk (CD)-shaped platform have been proposed. These devices are also referred to as Lab CD or Lab-on a CD.

An example of a valve unit included in a microfluidic device is disclosed in U.S. Patent Application Publication No. 2008/0042096. The valve unit includes an injection hole for injecting a phase transition material into the microfluidic device. To form the injection hole in the microfluidic device, which is an injection product, a protrusion corresponding to the injection hole has to be formed in a mold. A resin injected into the mold is separated from each other by the protrusion and then rejoined, which can cause a so-called weld-line formed in the injection product after the resin is cured. The weld-line deteriorates the rigidity of the microfluidic device, resulting in defects. In addition, it is difficult to smoothly polish the mold due to the protrusion formed in the mold. Thus, a surface of the injection product becomes rough and the smoothness thereof deteriorates. In addition, a process of closing the injection hole is further needed after forming the valve unit, and thus the manufacturing costs increase. Moreover, due to a draft angle formed in the protrusion in order to easily separate the injection product from the mold, an inclination is formed in an inner circumferential surface of the injection hole. As a result, the injection product has a step difference such that when the valve is operated by applying energy, such as electromagnetic waves, the step difference of the injection hole may cause diffusion of light. Thus, an operation of the valve unit may be interfered with and malfunction.

SUMMARY

One or more embodiments provide a valve unit that does not include an inlet for injecting a valve material to an inside of a microfluidic device, and thus can be manufactured relatively inexpensively.

One or more embodiments also provide a microfluidic device including the valve unit.

One or more embodiments also provide a method of fabricating the valve unit.

According to an aspect of one or more embodiments, there is provided a valve unit comprising: a first region formed in a lower substrate; a second region formed in the lower substrate to be deeper than the first region and be adjacent to one side of the first region; a third region formed in the lower substrate to be deeper than the first region and be adjacent to the other side of the first region; a valve material chamber formed in an upper substrate attached to the lower substrate, overlapping with a portion of the first region, constituting an overlapped portion, and not overlapping with the remaining portion of the first region, constituting a non-overlapped portion; and a valve material that is cured in the non-overlapped portion of the first region to close the first region, whereupon energy is applied to the valve material cured in the non-overlapped portion, such that the valve material is removed from the first region, resulting in opening of the first region.

According to another aspect of one or more embodiments, there is provided a microfluidic device comprising: a platform having a lower substrate, and an upper substrate attached to a top surface of the lower substrate; a channel, formed in the platform, providing a path of fluid flow; and the valve unit controlling the fluid flow via the channel.

According to another aspect of one or more embodiments, there is provided a method of fabricating a valve unit, the method comprising: forming a lower substrate comprising a first region, a second region formed to be deeper than the first region and be adjacent to one side of the first region, and a third region formed to be deeper than the first region and be adjacent to the other side of the first region; forming an upper substrate comprising a valve material chamber; injecting a valve material into the valve material chamber and curing the valve material; attaching a surface of the upper substrate in which the valve material chamber is formed to a surface of the lower substrate in which the first through third regions are formed, such that the valve material chamber overlaps with a portion of the first region, constituting an overlapped portion, and does not overlap with the remaining portion of the first region, constituting a non-overlapped portion; melting the valve material accommodated in the valve material chamber to flow the valve material into the non-overlapped portion of the first region; and recurring the valve material flowed into the non-overlapped portion to close the first region.

When the first region is opened, the valve unit may allow a fluid to flow from the second region to the third region, and the non-overlapped portion may be disposed closer to the second region than the overlapped portion.

Each of the lower substrate and the upper substrate may comprise a thermoplastic resin.

The valve material may comprise a phase transition material that is in a solid state at room temperature and melted when the phase transition material absorbs energy.

The valve material may comprise a plurality of micro heating particles, dispersed in the phase transition material, generating heat when the micro heating particles absorb electromagnetic wave energy.

The micro heating particles may comprise metal oxide particles.

The phase transition material may comprise a wax, a gel, or a thermoplastic resin.

The second region and the third region may be formed in the channel of the microfluidic device.

The microfluidic device may further comprise a chamber connected to one side of the channel, accommodating a fluid, wherein the second region or the third region is formed in the chamber.

The platform may be configured to be rotatable by using a motor.

BRIEF DESCRIPTION OF THE DRAWINGS

The above and other aspects will become more apparent by describing in detail exemplary embodiments thereof with reference to the attached drawings in which.

DETAILED DESCRIPTION

Hereinafter, exemplary embodiments of a valve unit, a microfluidic device including the same, and a method of fabricating the valve unit will be described more fully with reference to the accompanying drawings.

Figure 1:
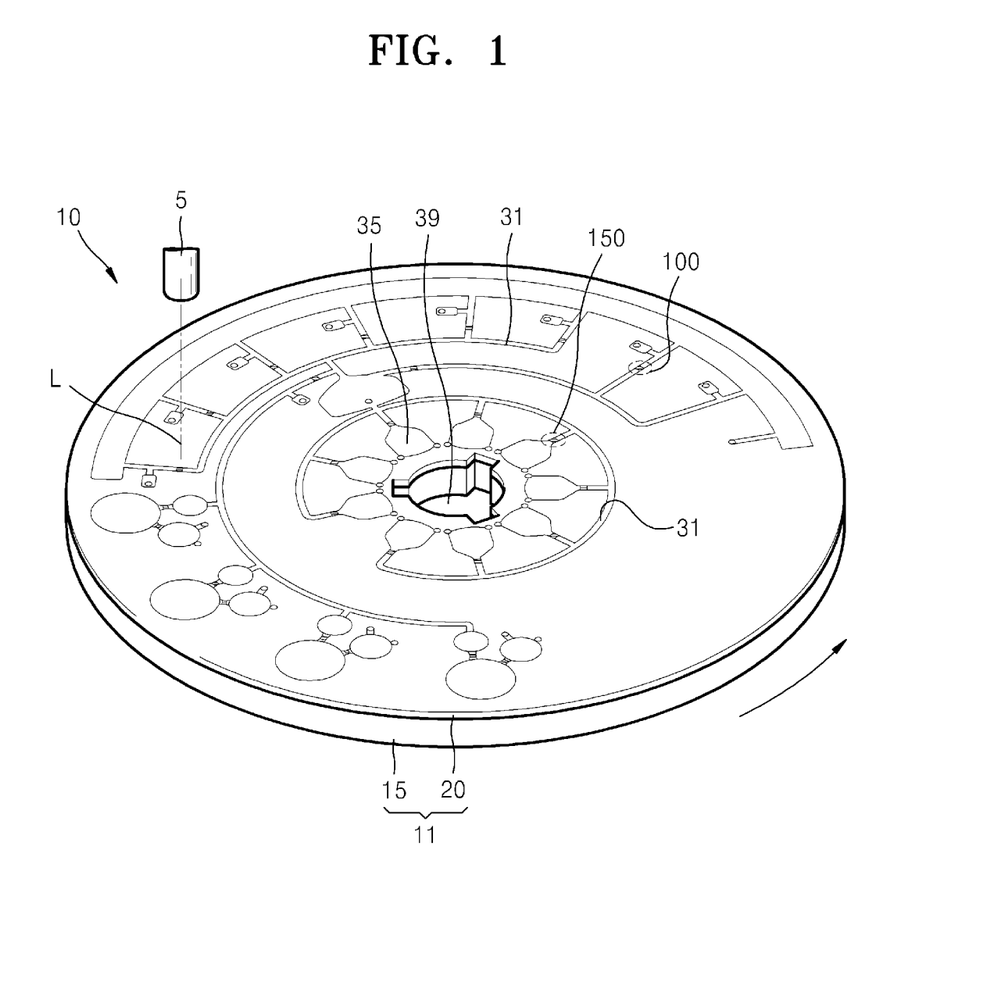
FIG. 1 is a perspective view illustrating a microfluidic device according to an embodiment.

FIG. 1 is a perspective view illustrating a microfluidic device 10 according to an embodiment. Referring to FIG. 1, the microfluidic device 10 includes a platform 11 that is disk-shaped and rotatable. The platform 11 includes a lower substrate 15 and an upper substrate 20 bonded to the lower substrate 15. Each of the lower substrate 15 and the upper substrate 20 may be formed of a thermoplastic resin.

The microfluidic device 10 includes a plurality of chambers 35 for accommodating a fluid therein, a channel 31 that is connected to the chambers 35 and provides a path for fluid flow, and valve units 100 and 150 for controlling the fluid flow via the channel 31. In addition, the microfluidic device 10 may engage with a spindle motor (not shown) which can rotate the platform 11 at high speed. An installation hole 39 is formed at a center portion of the microfluidic device 10 so as to accommodate the spindle motor. Due to rotation of the platform 11 by the spindle motor, fluid in the chambers 35 or channel 31 of the microfluidic device 10 is pressurized in a radial direction towards an outer circumferential portion of the platform 11.

In the microfluidic device 10, the arrangement of the chambers 35, the channel 31, and the valve units 100 and 150 is determined by specific biochemical applications, such as centrifugal separation of a fluid sample, an immune serum reaction, gene analysis, or the like. That is, the embodiments are not limited to the arrangement of the chambers 35, the channel 31 and valve units 100 and 150 of the microfluidic device 10 as illustrated in FIG. 1, and the microfluidic device 10 can have a variety of structures according to the use thereof.

Figure 2:
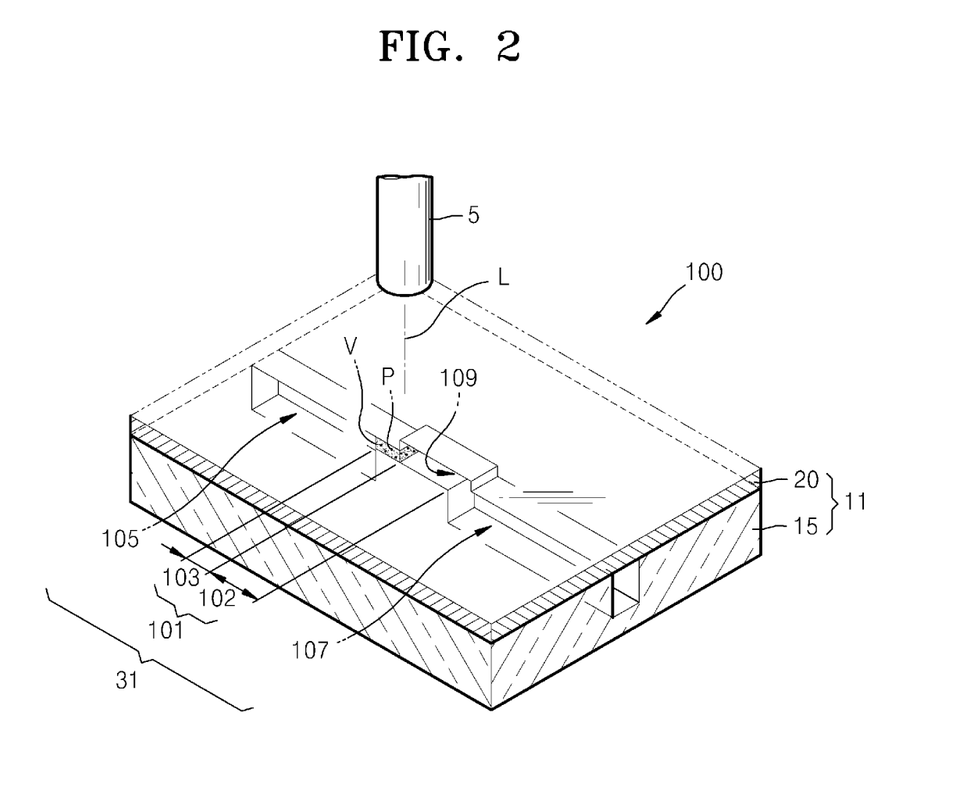
FIG. 2 is a perspective view illustrating a valve unit according to an embodiment.
Figure 3:
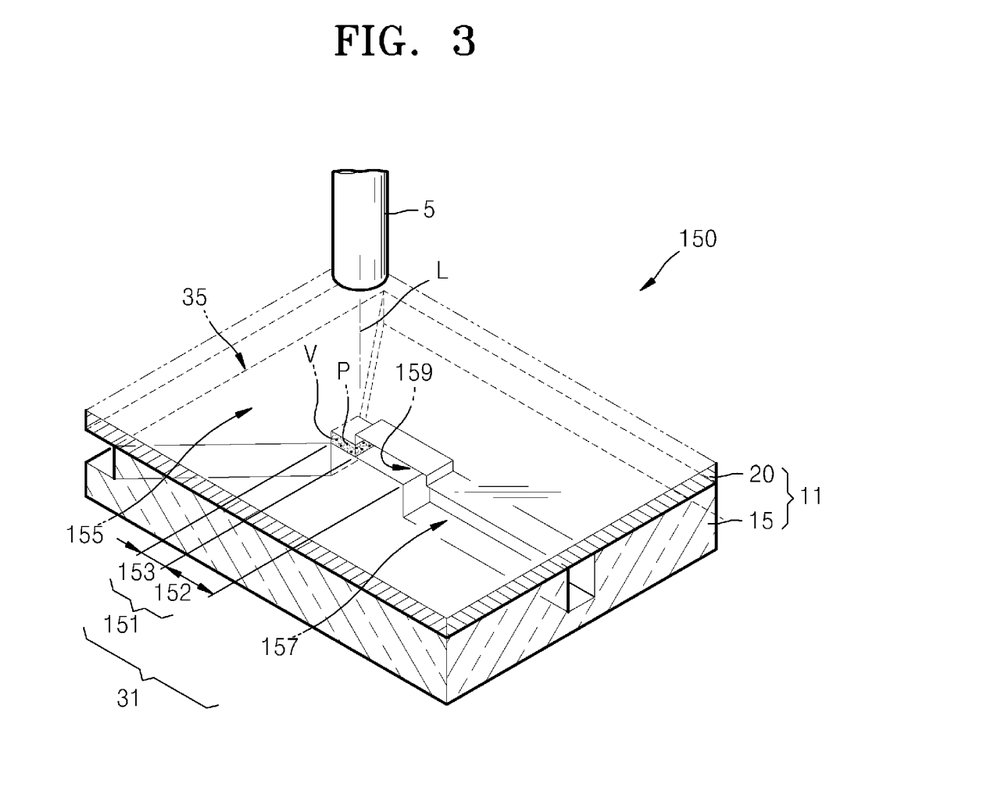
FIG. 3 is a perspective view illustrating a valve unit according to another embodiment.

FIG. 2 is a perspective view illustrating one of the valve units 100 of the microfluidic device 10 of FIG. 1, according to an embodiment. FIG. 3 is a perspective view illustrating one of the valve units 150 of the microfluidic device 10 of FIG. 1, according to another embodiment. The valve units 100 may be disposed in the channel 31 of the microfluidic device 10 of FIG. 1. The valve units 150 may be disposed adjacent to the chambers 35 of the microfluidic device 10 of FIG. 1, respectively.

Figure 4A:
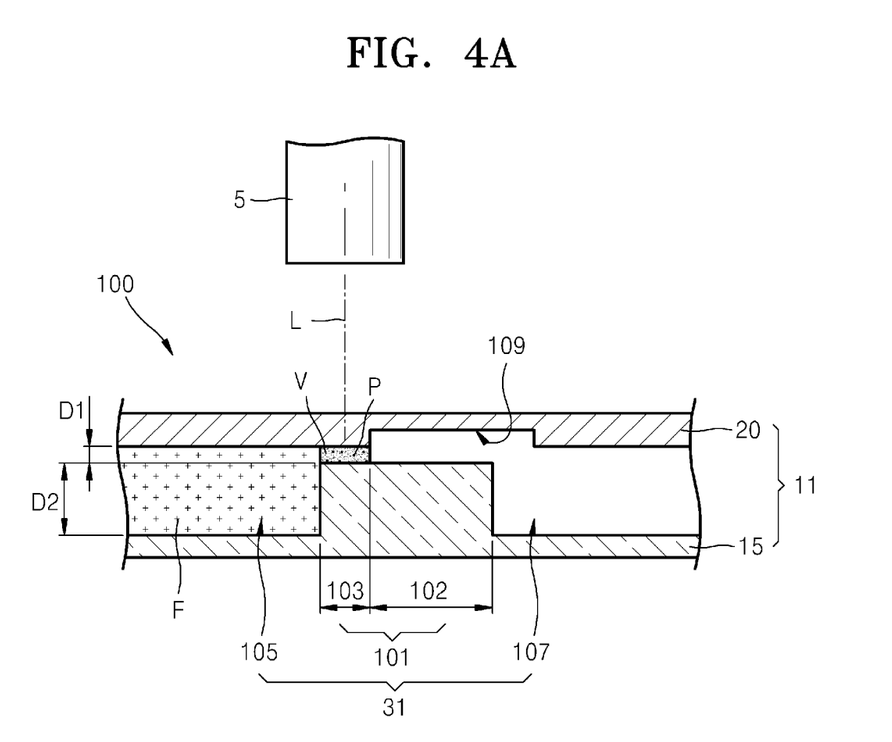
FIGS. 4A and 4B are cross-sectional views sequentially illustrating a process of operating the valve unit of FIG. 2, according to an embodiment.

Referring to FIG. 2, the valve unit 100 includes a first region 101, a second region 107, and a third region 105 that are formed in the channel 31. The first region 101 is formed downward from a top surface of the lower substrate 15. The second region 107 is formed downward from a top surface of the lower substrate 15, is deeper than the first region 101 and is adjacent to one side of the first region 101 with a step. The third region 105 is formed downward from a top surface of the lower substrate 15, is deeper than the first region 101 and is adjacent to the other side of the first region 101 with a step. Referring to FIG. 4A, the second region 107 and the third region 105 have the same depth D2, and the first region 101 has a depth D1 which is less than the depth D2 of the second region 107 and the third region 105. Thus, the first region 101 is a stepped region which protrudes upward from a bottom surface of the channel 31.

In addition, the valve unit 100 includes a valve material chamber or cavity 109 that is formed upward from a bottom surface of the upper substrate 20 and extends only partially through the upper substrate 20. The valve material chamber 109 partially overlaps with the first region 101. A portion of the first region 101 overlapped with the valve material chamber 109 is referred to as an overlapped portion 102, and the remaining portion of the first region 101, which is not overlapped with the valve material chamber 109, is referred to as a non-overlapped portion 103. A valve material V is initially accommodated in the valve material chamber 109 in a cured form. The valve material V accommodated in the valve material chamber 109 is melted so that it flows into the non-overlapped portion 103 of the first region 101. The valve material V is then cured again to close the first region 101. The non-overlapped portion 103 is adjacent to the third region 105 and the overlapped portion 102 is adjacent to the second region 107.

The valve material V includes a phase transition material that melts when heated, and a plurality of micro heating particles P (refer to FIG. 4A) that are dispersed in the phase transition material and generate heat by absorbing electromagnetic wave energy. For example, the phase transition material may be a wax. When the wax is heated, it is melted into a liquid state and a volume of the wax expands. Examples of the wax may include paraffin wax, microcrystalline wax, synthetic wax, natural wax, and the like.

Alternatively, the phase transition material may be a gel or a thermoplastic resin. The gel may be one selected from the group consisting of polyacrylamide, polyacrylates, polymethacrylates, and polyvinylamides. The thermoplastic resin may be one selected from the group consisting of cyclic olefin copolymer (COC), polymethylmethacrylate (PMMA), polycarbonate (PC), polystyrene (PS), polyoxymethylene (POM), perfluoralkoxy (PFA), polyvinylchloride (PVC), polypropylene (PP), polyethylene terephthalate (PET), polyetheretherketone (PEEK), polyamide (PA), polysulfone (PSU), and polyvinylidene fluoride (PVDF).

The micro heating particles P may be uniformly dispersed throughout the wax and may have a diameter of 1 nm to 100 μm in order to freely pass through the channel 31. When electromagnetic wave energy is supplied, for example, by radiation of a laser L emitted from a laser light source 5, the temperature of the micro heating particles P is rapidly increased by the energy such that the micro heating particles P generate heat. Each of the micro heating particles P can include a core comprising a metal component and a hydrophobic surface on the core. For example, each of the micro heating particles P can have a molecular structure including a iron (Fe) core and a plurality of surfactants coupled to the Fe core and surrounding the Fe core.

In general, the micro heating particles P may be stored by dispersing them in carrier oil. The carrier oil may be hydrophobic so as to allow the micro heating particles P with the hydrophobic surface to be dispersed uniformly. The valve material V may be formed by adding carrier oil in which the micro heating particles P are dispersed to a melted phase transition material and mixing them together.

In the above description, the micro heating particles P have a polymer type particle structure. However, the embodiments are not limited thereto, and the micro heating particles P can have various other particle structures, such as a quantum dot or a magnetic bead structure. Further, the micro heating particles P can include a metal oxide, such as $Al_2O_3$, $TiO_2$, $Ta_2O_3$, $Fe_2O_3$, $Fe_3O_4$, or $HfO_2$. Alternatively, the valve material V may not necessarily include the micro heating particles P, and may include only the phase transition material without the micro heating particles P.

The valve unit 100 is a normally closed valve in which the channel 31, which is closed, is opened by irradiating electromagnetic wave energy to the valve material V. The laser light source 5 is an example of an energy source for irradiating electromagnetic waves to the valve material V, and provides energy to the valve material V by irradiating electromagnetic waves, for example, radiation of the laser L to the valve material V. The laser light source 5 may include a laser diode (LD).

Figure 4B:
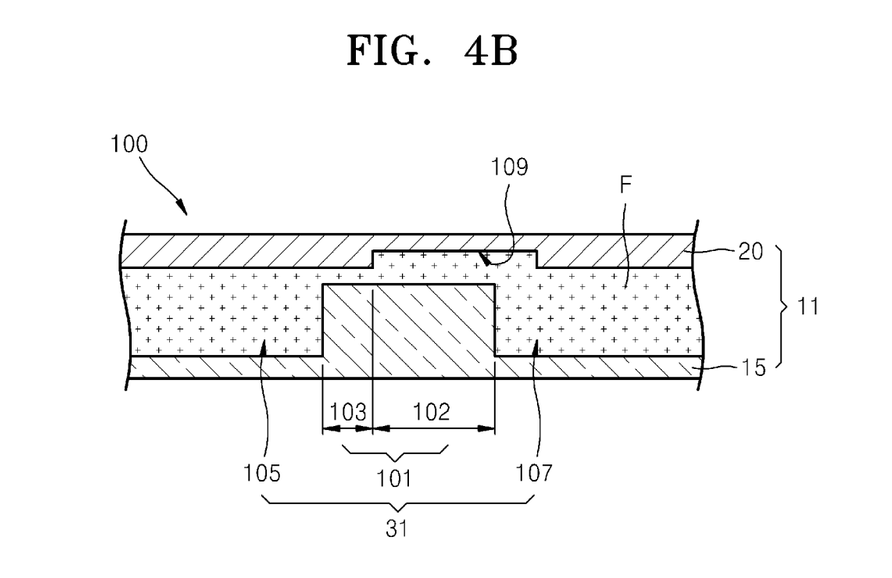

FIGS. 4A and 4B are cross-sectional views sequentially illustrating a process of operating the valve unit 100 of FIG. 2, according to an embodiment. Referring to FIG. 4A, a fluid F is intended to flow from the third region 105 to the second region 107 via the channel 31. However, the valve material V cured in the non-overlapped portion 103 closes the first region 101, and thus the fluid F cannot flow. In this regard, when the laser L is irradiated to the valve material V by using the laser light source 5 for a period of time, the micro heating particles P included in the valve material V are rapidly heated, and thus the phase transition material is rapidly heated. As a result, the valve material V is rapidly melted, and accordingly, the first region 101 is opened, and the fluid F can flow from the third region 105 to the second region 107, as illustrated in FIG. 4B.

Referring to FIG. 3, the valve unit 150 includes a first region 151, a second region 157 and a third region 155. The first region 151 and the second region 157 are formed in the channel 31, while the third region 155 is formed in the chamber 35. The first region 151 is formed downward from a top surface of the lower substrate 15. The second region 157 is formed downward from a top surface of the lower substrate 15, is deeper than the first region 151 and is adjacent to one side of the first region 151 with a step. The third region 155 is formed downward from a top surface of the lower substrate 15, is deeper than the first region 151 and is adjacent to the other side of the first region 151 with a step.

In addition, the valve unit 150 includes a valve material chamber 159 that is formed upward from a bottom surface of the upper substrate 20. The valve material chamber 159 also overlaps with an overlapped portion 152 of the first region 151 and does not overlap with a non-overlapped portion 153 of the first region 151, similar to the valve material chamber 109 of the valve unit 100 of FIG. 2. The non-overlapped portion 153 is adjacent to the third region 155 and the overlapped portion 152 is adjacent to the second region 157. A valve material V is initially accommodated in the valve material chamber 159 in a cured form. The valve material V accommodated in the valve material chamber 159 is melted so that it flows into the non-overlapped portion 153 of the first region 151. The valve material V is then cured again to close the first region 151.

The valve unit 150 is also a normally closed valve that opens the channel 31 when the valve material V is irradiated by the laser light L emitted from the laser light source 5, similar to the valve unit 100 of FIG. 2. The valve material V of FIG. 3 is the same as the valve material V of the valve unit 100 of FIG. 2, and thus a description thereof is not repeated here.

FIGS. 5A through 5D are cross-sectional views sequentially illustrating a method of fabricating the valve unit of FIG. 2, according to an embodiment.

Figure 5A:
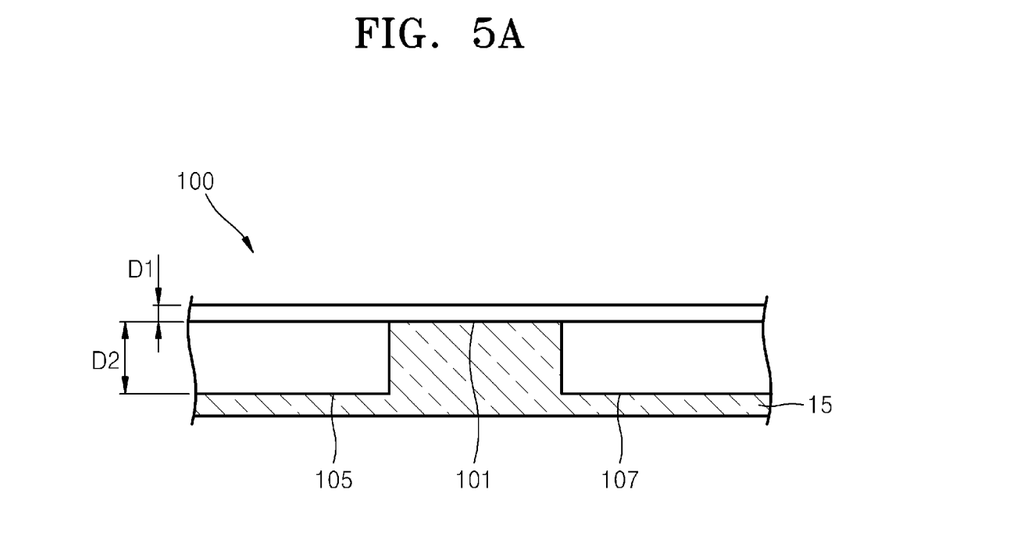
FIGS. 5A, 5B, 5C and 5D are cross-sectional views sequentially illustrating a method of fabricating the valve unit of FIG. 2, according to an embodiment.

Referring to FIG. 5A, to fabricate the valve unit 100 of FIG. 2, first, the lower substrate 15 is prepared. The lower substrate 15 includes the channel 31 having the first region 101 formed to a first depth D1, the second region 107 formed to a second depth D2 greater than the first depth D1 and adjacent to one side of the first region 101 with a step, and the third region 105 formed to the second depth D2 and adjacent to the other side of the first region 101 with a step. The lower substrate 15 may be prepared by injection molding a thermoplastic resin.

Figure 5B:
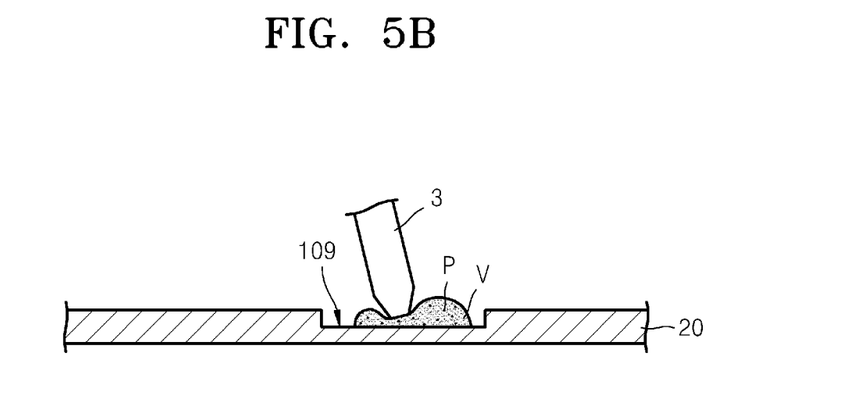

Referring to FIG. 5B, to fabricate the valve unit 100, the upper substrate 20 is prepared. The upper substrate 20 may be thinner than the lower substrate 15, and includes the valve material chamber 109. The upper substrate 20 may also be prepared by injection molding the thermoplastic resin. The upper substrate 20 does not include an inlet for injecting the valve material to the microfluidic device 10, and thus a so-called weld line is not formed in the injection molding process. Thus, a possibility of a rigidity defect of the upper substrate 20 decreases. In addition, a process of closing the inlet is unnecessary, and thus the manufacturing costs can be reduced.

A melted valve material V is injected into the valve material chamber 109 by using a means, for example, a dispenser 3, and then cured. The valve material V is prepared by mixing a phase transition material with a plurality of micro heating particles P, as described above, and when the valve material V is cured, it is adhered to the valve material chamber 109.

Figure 5C:
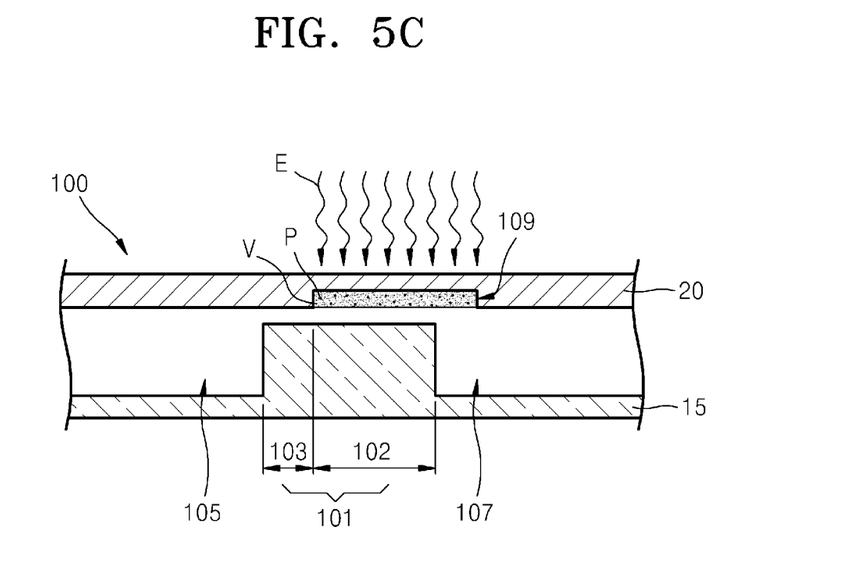

Referring to FIG. 5C, the surface of the upper substrate 20 in which the valve material chamber 109 is formed is bonded to a surface of the lower substrate 15 in which the first, second and third regions 101, 107 and 105 are formed. The upper substrate 20 and the lower substrate 15 are bonded to each other using, for example, an ultraviolet (UV) adhesive method or an ultrasonic welding method. The upper and lower substrates 20 and 15 are bonded to each other such that the valve material chamber 109 is disposed to partially overlap with a portion of the first region 101. In addition, the non-overlapped portion 103 of the first region 101, which is not overlapped with the valve material chamber 109, is disposed to be adjacent to the third region 105 and the overlapped portion 102 of the first region 101, which is overlapped with the valve material chamber 109, is disposed to be adjacent to the second region 107.

Figure 5D:
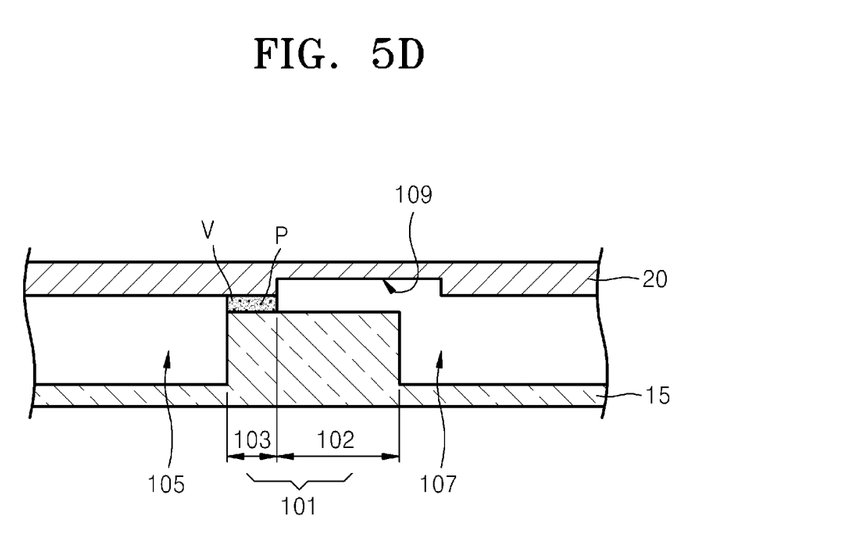

Then, the lower substrate 15 and the upper substrate 20 are heated, or the valve material V is supplied with energy E by irradiating laser beams thereto, thereby melting the valve material V. Referring to FIG. 5D, some of the melted valve material V flows into the non-overlapped portion 103 of the first region 101 by a capillary phenomenon and remains there The valve material V in the non-overlapped portion 103 is cured again at room temperature, thereby closing the non-overlapped portion 103 of the first region 101. As a result, the manufacture of the valve unit 100 of FIG. 2 is completed.

Since it is difficult to accurately measure the valve material V, a small amount of the valve material V may flow over a boundary of the valve material chamber 109 when the valve material V is injected to the valve material chamber 109. Due to the overflow of the valve material V, when the upper substrate 20 is bonded to the lower substrate 15, portions of the upper substrate 20 and the lower substrate 15 adjacent to the valve material chamber 109 may not be rigidly attached to each other. However, the non-overlapped portion 103 closed by the valve material V is formed upstream to the valve material chamber 109 in terms of the flow direction of the fluid F illustrated in FIG. 4A, and thus the leakage of the fluid F can be prevented. Indeed, through an experiment in which a plurality of valve units the same as the valve unit 100 of FIG. 2 were formed in a platform and the platform was rotated at 4000 rpm for 5 minutes, no leakage of fluid in any of the valve units occurred.

While exemplary embodiments has been particularly shown and described, it will be understood by those of ordinary skill in the art that various changes in form and details may be made therein without departing from the spirit and scope of the inventive concept as defined by the following claims.

What is claimed is:

1. A method of fabricating a valve unit, the method comprising:
    forming a lower substrate comprising a channel including a first region and a second region which is deeper than the first region and is adjacent to one side of the first region;
    forming an upper substrate comprising a valve material chamber which extends only partially through the upper substrate;
    after the forming of the upper substrate, filling the valve material chamber with a valve material and curing the valve material in the valve material chamber;
    attaching a surface of the upper substrate in which the valve material chamber is formed to a surface of the lower substrate in which the channel is formed, so that the valve material chamber overlaps an overlapped portion of the first region, and does not overlap a non-overlapped portion of the first region;
    melting the valve material accommodated in the valve material chamber to flow the valve material into the non-overlapped portion of the first region; and
    curing the valve material flowed into the non-overlapped portion to close the first region.

2. The method of claim 1, wherein the channel of the lower substrate further includes a third region which is deeper than the first region and is adjacent to another side of the first region.

3. The method of claim 2, wherein the attaching the upper substrate to the lower substrate comprises attaching the upper and lower substrates so that the non-overlapped portion of the first region is adjacent to the third region and the overlapped portion of the first region is adjacent to the second region.

4. The method of claim 1, wherein lower substrate further comprises a chamber including a third region which is deeper than the first region and is adjacent to another side of the first region.

5. The method of claim 4, wherein the attaching the upper substrate to the lower substrate comprises attaching the upper and lower substrates so that the non-overlapped portion of the first region is adjacent to the third region and the overlapped portion of the first region is adjacent to the second region.

6. The method of claim 1, wherein each of the lower substrate and the upper substrate is formed by molding a thermoplastic resin.

7. The method of claim 1, wherein the valve material comprises a phase transition material that is in a solid state at room temperature and melts when heated.

8. The method of claim 7, wherein the valve material further comprises a plurality of micro heating particles which are dispersed in the phase transition material and generate heat when subjected electromagnetic energy.

9. The method of claim 8, wherein the micro heating particles comprise metal oxide particles.

10. The method of claim 6, wherein the phase transition material comprises a wax, a gel, or a thermoplastic resin.

11. The method of claim 1, wherein the attaching the upper substrate to the lower substrate comprises attaching the upper and lower substrates so that the valve material chamber overlaps a portion of the second region.

12. A method of fabricating a valve unit, the method comprising:
    attaching a first surface of a first substrate to a second surface a second substrate, wherein the first substrate includes a channel which is formed in the first surface and has a stepped region which protrudes from a bottom surface of the channel, the second substrate includes a cavity which is formed in the second surface and extends only partially through the second substrate, the cavity overlaps a first portion of the stepped region of the channel and does not overlap a second portion of the stepped region of the channel, and the cavity contains a material that is injected and cured after forming the second substrate;
    melting the material accommodated in the cavity so that the material flows from the cavity to the second portion of the stepped region of the channel to close the channel.

13. The method of claim 12, wherein a depth of the channel in the stepped region is less than a depth of the channel in a region of the channel adjacent to the stepped region.

14. The method of claim 12, wherein the attaching the first substrate to the lower substrate comprises attaching the upper and lower substrates such that the cavity extends past the first portion of the stepped region of the channel.

15. The method of claim 12, wherein the melting the material comprises irradiating the material with electromagnetic energy to heat the material.

16. The method of claim 12, wherein each of the lower substrate and the upper substrate is formed by molding a thermoplastic resin.

17. The method of claim 12, wherein the material comprises a phase transition material that is in a solid state at room temperature and melts when heated.

18. The method of claim 17, wherein the phase transition material comprises a wax, a gel, or a thermoplastic resin.

19. The method of claim 17, wherein the material further comprises a plurality of micro heating particles which are dispersed in the phase transition material and generate heat when subjected electromagnetic energy.

20. The method of claim 19, wherein the micro heating particles comprise metal oxide particles.

* * * * *